E. M. INGALLS.
SUPPORTING DEVICE FOR AUTOMOBILES.
APPLICATION FILED NOV. 21, 1910.

1,032,607. Patented July 16, 1912.

Witnesses:
M. G. Crozier
J. Murphy

Inventor.
Edwin M. Ingalls
by Jas. H. Churchill
Atty.

UNITED STATES PATENT OFFICE.

EDWIN M. INGALLS, OF NEWBURYPORT, MASSACHUSETTS.

SUPPORTING DEVICE FOR AUTOMOBILES.

1,032,607.  Specification of Letters Patent. Patented July 16, 1912.

Application filed November 21, 1910. Serial No. 593,298.

*To all whom it may concern:*

Be it known that I, EDWIN M. INGALLS, a citizen of the United States, residing in Newburyport, county of Essex, and State of Massachusetts, have invented an Improvement in Supporting Devices for Automobiles, of which the following description, in connection with the accompanying drawings, is a specification, like letters on the drawings representing like parts.

This invention relates to an adjustable support for the chassis or frame of automobiles and has for its object to provide a simple, inexpensive and efficient device, which is capable of being quickly and easily adjusted to cars of different widths and heights of frames above the floor, so that the car bodies may be supported in front of the rear axle or behind the front axle without interfering with the parts which may be located below the car body, whereby either axle may be bodily removed from beneath the car body without removing the wheels. To this end, the supporting device comprises two vertical side members, each of which is composed of two parts, one vertically adjustable with relation to the other, and two connecting cross bars having provision for permitting said vertical side members to be adjusted toward and from each other, as will be described. These and other features of this invention will be pointed out in the claims at the end of this specification.

Figure 1:
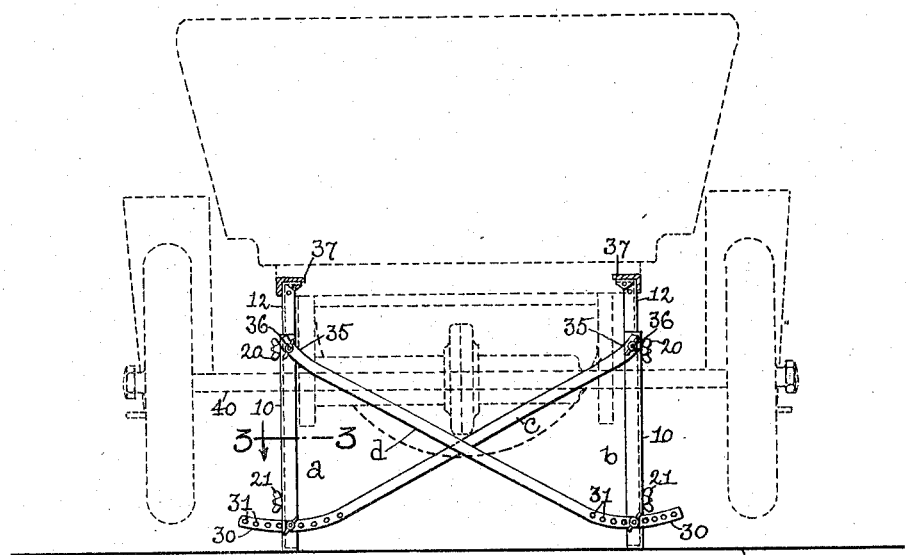
Figure 2:
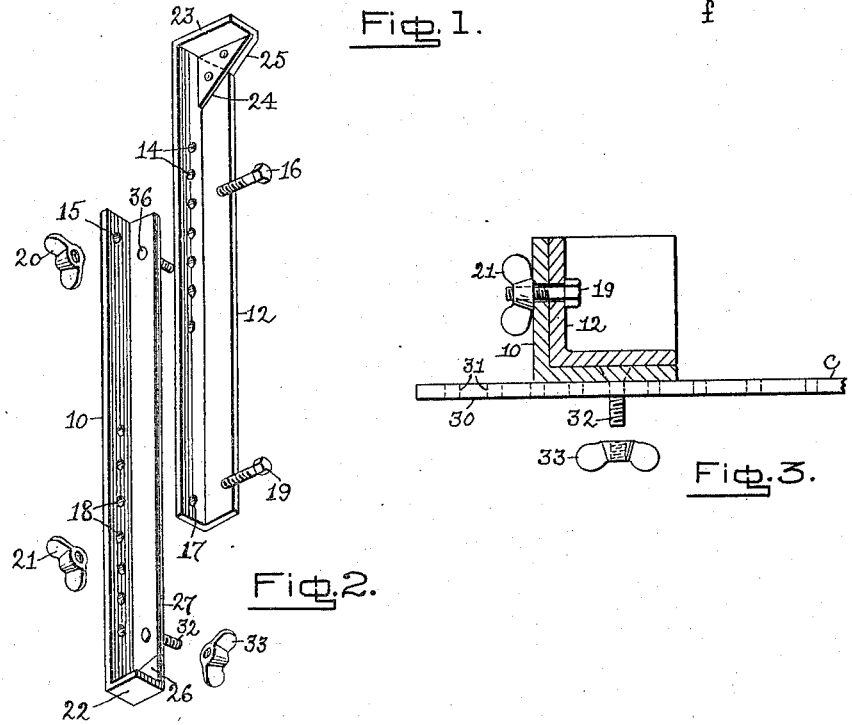
Figure 3:
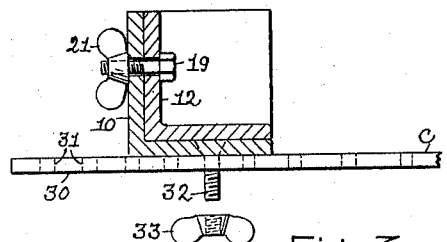

Figure 1 is an elevation of a supporting device embodying this invention, showing the same applied to the rear portion of an automobile. Fig. 2, a perspective view of the parts comprising the side members, and Fig. 3, a cross section on an enlarged scale, taken on the line 3—3, Fig. 1.

Referring to the drawing, *a*, *b* represent the side members, and *c*, *d*, the cross bars of a supporting device embodying this invention. The side members *a*, *b*, are of like construction and each is composed of two parts or sections 10, 12, (see Fig. 2), preferably of angle iron and adjustably secured together so that the upper section 12 may be moved vertically with relation to the lower section 10, so as to lengthen or shorten the side member according to the height of the car frame of the automobile above the floor *f*. To provide for this vertical adjustment of the section 12, the latter is provided with a series of holes 14, which are designed to register with a hole 15 in the upper end of the section 10 for the passage of a bolt 16, and the section 12 is provided at its lower end with a hole 17 which is designed to register with a series of holes 18 in the section 10, for the passage of a bolt 19. The bolts 16, 19, have coöperating with them, nuts 20, 21, by means of which the sections 10, 12, may be firmly secured together in their adjusted position.

The lower section 10 may and preferably will be provided at its lower end with a bottom piece or foot 22, and the section 12 may and preferably will be provided at its upper end with a laterally extended top piece or head 23 preferably integral with the section 12 and reinforced by the piece 24, which is riveted to one of the sides of the section 12 and to a flange or lip 25 depending from the head 23, said lip or flange and the upper end of the side with which it coöperates being cut on an incline or bevel as represented in Fig. 2. The bottom or foot piece 22 is also provided with an upturned lip or flange 26, provided with an inclined upper edge, which coöperates with the inclined lower edge of the side 27 of the section 10.

The sections 10 of the two side bars *a*, *b*, are connected by the cross bars *c*, *d*, of like construction, and each of which is attached at its upper end to the upper end of one of the sections 10 and at its lower end to the lower end of the other section 10, so that said cross bars are arranged diagonally and cross each other at a substantial distance below the level of the upper ends of the sections 10, thereby enabling the device to be applied to automobiles without interfering with the muffler and other parts attached to the chassis near the underside of the car body.

To enable the cross bars to be connected with the sections 10 near the lower end of the same and thereby obtain greater stability for the apparatus, the cross bars are provided with curved lower portions 30, which are provided with holes 31 to permit the bars to be fitted over stud bolts 32 fixed to the sections 10, said bars being secured at their lower ends by nuts 33, which engage the stud bolts. The cross bars may also be provided with curved portions 35 at their upper ends, which are provided with holes for the reception of the stud bolts 36 affixed to the sections 10 at their upper ends.

In operation with the apparatus herein shown, the frame or chassis of the automobile is jacked up in any suitable manner to a sufficient height to enable the side members to be placed under the side bars 37 of the frame or chassis behind the front axle or in front of the rear axle and when thus placed the cross bars $c$, $d$, are secured to the sections 10 in their operative position as represented in Fig. 1, and when thus secured the car body can be lowered so as to rest upon the heads 23 of the side members, after which the jack is removed and the body of the car is supported at one end upon the device.

When the rear portion of the car is supported by the device herein shown, the front wheels may rest on the floor and be blocked or trigged in any suitable manner.

From the above description, it will be seen that the supporting device can be located in front of the rear axle 40 of the car, and that the latter with the wheels mounted thereon can be removed bodily, when it is desired or required to repair the axle or any part of the rear construction. In the same way, the front axle can be bodily removed with the wheels thereon by placing the supporting device behind the front axle.

As represented in Fig. 1, the side members of the supporting device are arranged so that their heads extend laterally toward each other, but it is evident the said members may have their positions reversed or changed so that the heads extend outwardly away from each other.

By making the lower portions of the cross bars curved after the manner shown in Fig. 1, the side bars may be adjusted toward and from each other according to the width of the car without changing the position of the stud bolts 32, which can be fixed and located substantially close to the bottom of the sections 10, thereby increasing the stability of the supporting device.

The device herein shown is especially useful in garages and repair shops for automobiles.

I may prefer to make the members of the side bars as angle irons, but I do not desire to limit the invention in this respect.

The device is capable of being readily assembled or taken down when not in use.

I have herein shown one construction of supporting device, which I may prefer but I do not desire to limit the invention to the particular construction shown.

Claims.

1. A supporting device of the character described, comprising side members, each composed of angle iron lower and upper sections, the lower section being provided in one side with a plurality of vertically arranged holes and on its other side with fixed stud bolts located near the upper and lower ends of said side, and the upper section having in one side a plurality of holes capable of registering with the holes in the lower section, and bolts extended through said holes to secure said sections in fixed relation, and cross bars having holes at their upper ends to fit over the stud bolts at the top of the lower sections, and having curved lower portions provided with holes to fit over the stud bolts at the lower end of said lower sections, and means to engage said stud bolts and secure said cross bars in fixed relation to said lower sections, substantially as described.

2. A supporting device of the character described, comprising side members, each composed of an angle iron lower section and an angle iron upper section fitted to slide on said lower section, means to secure said sections in fixed relation, and cross bars secured at their upper ends to the lower sections near the upper end of the same, and provided at their lower ends with curved portions, and means to secure said curved portions in fixed relation to said lower sections near the bottom of the same.

3. A supporting device of the character described, comprising side members, each composed of a lower section and an upper section vertically adjustable with relation to said lower section, means to secure said sections in fixed relation, cross bars connected at their upper ends to said lower sections near the upper ends of the latter and having curved portions at their lower ends for connection with said lower sections near the lower ends of the same, substantially as described.

4. A supporting device of the character described, comprising side members, each composed of a lower section and an upper section vertically adjustable with relation to said lower section, means to secure said sections in fixed relation, cross bars connecting the upper end of the lower section of one side member with the lower end of the lower section of the other side member, and means for adjustably securing one end of said cross bars to said lower sections to permit the side members to be moved toward and from each other, substantially as described.

5. A supporting device of the character described, comprising side members, each composed of a lower section and an upper section vertically adjustable with relation to said lower section, the upper sections of said side members being disconnected from each other to enable them to engage the side bars of an automobile chassis, means to secure said upper sections in fixed relation to said lower sections, and means for connecting together the lower sections of said side members, substantially as described.

6. A supporting device of the character described, comprising side members, and cross bars diagonally arranged and connecting the upper end of each of said side members with the lower end of the other of said side members to permit the device to be applied to automobiles without interfering with the mechanism of the vehicle located below the body thereof, and means for adjustably connecting said cross bars to said side members, substantially as described.

In testimony whereof, I have signed my name to this specification in the presence of two subscribing witnesses.

EDWIN M. INGALLS.

Witnesses:
JAS. H. CHURCHILL,
J. M. MURPHY.

Copies of this patent may be obtained for five cents each, by addressing the "Commissioner of Patents, Washington, D. C."